United States Patent
Herzog et al.

(12)

(10) Patent No.: US 6,359,084 B1
(45) Date of Patent: Mar. 19, 2002

(54) GAS PHASE POLYMERIZATION PROCESS

(75) Inventors: Marc Herzog, Sausset les Pins; Jean-Pierre Isnard, Martigues; Claudine Lalanne-Magne, Saint Mitre les Remparts; Patrick Leaney, Bouc Bel Air, all of (FR); Myung-Je Shin, Anvers (BE)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/713,212

(22) Filed: Nov. 16, 2000

Related U.S. Application Data

(63) Continuation of application No. PCT/GB99/01575, filed on May 18, 1999.

(30) Foreign Application Priority Data

May 19, 1998 (EP) .............................. 98430012

(51) Int. Cl.$^7$ .............................. C08F 2/40; C08F 10/00
(52) U.S. Cl. ............................. 526/84; 526/82; 526/901
(58) Field of Search ............................ 526/82, 901, 84

(56) References Cited

U.S. PATENT DOCUMENTS 5,688,865 A    11/1997    Ali et al. ...................... 525/53

FOREIGN PATENT DOCUMENTS

| EP | 035944.4 | 3/1990 |
| EP | 0366823 | 5/1990 |
| EP | 0811638 | 12/1997 |
| WO | WO98/12231 | 3/1998 |
| WO | WO98/20045 | 5/1998 |
| WO | WO98/30599 | 7/1998 |

*Primary Examiner*—Fred Teskin
(74) *Attorney, Agent, or Firm*—Finnegan, Henderson, Farabow, Garrett and Dunner, L.L.P.

(57) ABSTRACT

A process for the gas phase polymerization of one or more alpha-olefins conducted in the presence of a catalyst in a reactor having a fluidized bed, in which process, one or more zones having a temperature greater than the average bed temperature are formed at or in close proximity to the reactor wall, comprising the step of deactivating said zones by the introduction into the reactor of an effective quantity of carbon monoxide.

10 Claims, No Drawings

GAS PHASE POLYMERIZATION PROCESS

RELATED APPLICATIONS

This application is a continuation of International Application No. PCT/GB99/01575 filed May 18, 1999.

BACKGROUND OF THE INVENTION

The present invention relates to a process for the gas phase polymerisation of alpha-olefins in a fluidised bed reactor and in particular to a process for the introduction of a deactivating agent into the reactor whilst maintaining a substantially constant polymerisation rate.

It is known to polymerise one or more alpha-olefins, such as ethylene or propylene, in the gas-phase in a fluidised bed reactor, in the presence of a catalyst based on a transition metal belonging to the groups IV, V or VI of the Periodic Table of the Elements; in particular in the presence of a catalyst of the Ziegler-Natta type, chrominum oxide type or a metallocene catalyst. Catalyst particles, together with growing and formed polymer particles are kept in a fluidised and/or agitated state in a gaseous reaction mixture containing the alpha-olefin or alpha-olefins, which are introduced continuously into the reactor. The catalyst is introduced continuously or intermittently into the reactor while the polymer constituting the fluidised bed is withdrawn from the, reactor, also continuously or intermittently. The heat of the polymerisation reaction is essentially removed by the gaseous reaction mixture, which may be passed through a heat transfer means before being recycled into the reactor.

It is also known that in a gas-phase fluidised bed polymerisation reaction system, small variations in reaction conditions can have an adverse effect on the polymerisation reaction. For example, poor or loss of fluidising gas flow can cause catalyst particles, formed polymer particles and growing polymer particles to be insufficiently cooled by the gaseous reaction mixture passing through the reactor and this can give rise to the appearance of lacalise zones of catalyst particles and/or polymer particles e.g hot spots having increased temperature compared to the average temperature of the fluidised bed. These zones of increased temperature are likely to occur in the vicinity of, especially at or close to the reactor walls. Where a polymerisation reactor is equipped with a fluidisation grid the zones will typically occur in the region 0.25D to 0.75D above the grid (where D is the diameter of the reactor). Such zones are usually detected by the use of thermocouples or temperature indicators either attached to the reactor wall or inserted a small distance into the reactor itself.

The appearance of such zones of increased temperature can lead to the melting of the polymer particles resulting in the formation of agglomerates of molten polymer. If the reaction conditions are corrected sufficiently early, for example by lowering the polymerisation temperature or pressure, or by reducing the rate at which catalyst is supplied to the reactor in order to restrict such adverse effects, the amount and size of the agglomerates formed can be reduced to a certain extent. During this period, however, it will not be possible to avoid a drop in the polymer production and a probable deterioration in the quality of the polymer manufactured.

If the formation of agglomerates becomes severe there is a danger of creating irreversible process problems which will require the reactor to be shut down. One way in which the polymerisation process can be terminated quickly to avoid this is to introduce a deactivating agent whose purpose is to kill or terminate the fluidised bed polymerisation.

European Patent EP-B-0 471 479 discloses a process for completely stopping a gas-phase alpha-olefin polymerisation reaction carried out with the aid of a chromium oxide-based catalyst by introducing a deactivating agent such as oxygen, ammonia or carbon monoxide into the polymerisation reactor U.S. Pat. No. 4,306,044 discloses a system for introducing carbon dioxide into a gas-phase olefin polymerisation process to at least reduce the rate of the polymerisation reaction.

SUMMARY OF THE INVENTION

A process for the gas-phase polymerisation of an alpha-olefin has now been found which makes it possible to overcome, or at least mitigate, the above-mentioned disadvantages. In particular, the process makes it possible to treat, e.g deactivate, zones of increased temperature compared to the average temperature of the bed thereby controlling the formation of agglomerates. Moreover, the process allows the zones to be treated without killing or deactivating the entire fluidisation bed. Furthermore, the process according to the present invention obviates the need to stop production or shut down the reactor. Furthermore, the process of the present invention uses less deactivating agent than is theoretically required to slow down or stop an alpha-olefin polymerisation reaction.

The present invention therefore relates to a process for the gas-phase polymerisation of one or more alpha-olefins conducted in the presence of a catalyst in a reactor having a fluidised bed in which process, one or more zones having a temperature greater than the average bed temperature are formed at or in close proximity to the reactor wall, characterised in that said zones are deactivated by the introduction into the reactor of an effective quantity of a deactivating agent.

DETAILED DESCRIPTION OF THE INVENTION

The deactivating agent may be selected from a wide variety of products which are capable of reducing the polymerisation rate of an alpha-olefin in the presence of a catalyst based on a transition metal e.g a catalyst of the Ziegler-Natta type or a metallocene catalyst, or a chromium oxide type catalyst. The deactivating agent can be selected especially from polymerisation inhibitors or from poisons known for this type of reaction. Deactivating agents which can be selected in particular are carbon monoxide, oxygen and water, especially carbon monoxide.

The deactivating agent may be employed alone or, preferably, diluted in an inert gas such as nitrogen. When carbon monoxide is employed as the deactivating agent, it may be employed in the form of a gaseous mixture with an inert gas such as nitrogen. A mixture of two or more deactivating agents may be employed.

The deactivating agent is introduced into the polymerisation reactor in a quantity which is effective to deactivate zones of increased temperature at or in close proximity to the reactor walls such as hot spots and/or fouling without substantially affecting the polymerisation rate. For this purpose the deactivating agent is preferably introduced into the polymerisation reactor in an amount such that the weight ratio of the deactivating agent to the catalyst is in the range 0.0002–0.0011:1, preferably 0.0004–0.0010:1, especially 0.0007–0.0009:1. For example it has been found to be possible to deactivate hot spots and fouling without reducing the polymerisation reaction by introducing into the polymerisation reactor 0.0004–0.0011 g of carbon monoxide per gram of catalyst. The use of a quantity of deactivating agent which is too large would have the effect of stopping the polymerisation reaction. The minimum quantity of deactivating agent necessary for stopping a polymerisation reaction can be obtained by previous experimentation performed in a gas phase reactor working with known quantities of catalyst and of deactivating agent.

The deactivating agent is introduced into the polymerisation reactor over a relatively short period of time typically less than 5 minutes. The period of introduction of the deactivating agent is advantageously as short as possible and is preferably shorter than one minute and more preferably shorter than 30 seconds. The deactivating agent may be introduced intermittently throughout the polymerisation reaction i.e it may be introduced as and when required to deactivate any increased temperature zones which form throughout the polymerisation reaction. Furthermore, the feeding of catalyst and/or olefin into the polymerisation reactor need not be discontinued.

The deactivating agent may be introduced directly into the polymerisation reactor, preferably into a zone of the reactor where the deactivating agent is dispersed rapidly, for example underneath a fluidisation grid. Advantageously it is introduced at a point situated as close as possible to a reactor wall, e.g at the reactor wall and up to a distance of from 0.1D to 0.2D from the reactor wall where D is the reactor diameter. Furthermore, it may be advantageously introduced at a plurality of points, especially at two or more points close to the reactor wall. Preferably it is introduced at a plurality of points underneath a fluidisation grid. More especially it is introduced at a plurality of points underneath a fluidisation grid and up to a distance of 0.2D from the reactor wall. It can also be introduced into the line for recycling the gaseous mixture or into the line for supplying the reactor with alpha-olefin(s).

The polymerisation reaction is conducted in a reactor containing a fluidised bed by techniques known per se and using equipment such as that described in U.S. Pat. Nos. 3,922,322, 5,541,270, or 5,352,749, the disclosure of which are incorporated herein by reference. The apparatus can comprise essentially a fluidised-bed polymerization reactor comprising a vertical cylinder equipped with a fluidisation grid and supporting a disengagement chamber, a conduit for recycling the gas mixture, connecting the top of the disengagement chamber to the base of the reactor, which recycle conduit is provided with at least one heat exchanger and a gas compressor and with a conduit for introducing alpha-olefins. During the course of the polymerisation the bed comprises catalyst particles, growing polymer particles and formed polymer particles. The bed is maintained in a fluidised state by introducing a fluidising medium at a sufficient flow rate to cause the particles to separate and act as a fluid. The fluidising medium may consist of a single gas phase, e.g. a gas phase or it may be two phase for example it may consist of a gas phase and a liquid phase, for example, a mixture of gas and entrained liquid. In such a case the quantity of liquid in the gas phase may be about from 1–50 weight percent, for example 10–20 weight percent, preferably less than 10 weight percent, provided always that the velocity of the two-phase fluidising medium is high enough to keep the liquid phase in suspension in the gas and to support the fluidised bed in the reactor. The two-phase fluidising medium of gas and entrained liquid may be formed by cooling part or all of the unreacted fluids from the reactor below the dew point and re-introducing said two-phase mixture into the reactor. Alternatively a two-phase fluidising medium may be formed within the reactor, for example by separately injecting e.g. underneath a fluidisation grid or directly into the fluidised bed, gas and liquid under conditions which will produce a two-phase fluidising medium. A single phase fluidising medium or a substantially single phase fluidising medium such as a gas phase fluidising medium may be formed by cooling a recycle gaseous stream to a temperature sufficient to form a liquid and a gas and by separating the liquid from the gas and then feeding the gas into the reactor, for example by injection below the fluidisation grid. Alternatively, the recycle gaseous stream may be divided into a first stream and a second stream. The first stream is passed directly to the reactor in a conventional way by injection below the fluidisation grid and the second stream is cooled and the stream is separated into a gas and liquid stream. The gas stream may be returned to the first stream and re-introduced into the reactor below the bed, for example, below the fluidisation grid if such a grid is employed.

The fluidising medium may contain unreacted gaseous monomers, make-up monomers to replace monomers consumed by the polymerisation reaction, and optionally inert hydrocarbons e.g ethane, propane, butane, isobutane or isopentane, inert gases such as nitrogen, reaction activators or moderators e.g hydrogen.

The fluidisation grid positioned above the point of recycle ensures proper distribution of the fluidising medium to the bed and acts as a support for the bed when the supply of gas is cut off.

The polymerisation reaction may be carried out in the presence of a catalyst system of the Ziegler-Natta type, said catalyst essentially comprising a compound of a transition metal.

High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal (preferably titanium and/or vanadium and/or zirconium), of magnesium and of halogen.

The Ziegler-Natta type catalyst can be used directly as such or in the form of a prepolymer. The conversion to prepolymer is generally carried out by bringing the catalyst into contact with one or more alpha-olefins in amounts such that the prepolymer contains between 0.002 and 10 millimole of transition metal per gram.

A co-catalyst may also be advantageously used with the Ziegler-Natta catalyst such as organometallic compounds of metals belonging to Groups I, II or III of the Periodic Table of the elements, in particular organoaluminium compounds.

The process is also particularly suitable for use with Ziegler catalysts supported on silica. Preferred catalyst systems for use in the present invention are those disclosed in U.S. Pat. Nos. 5,336,652, 5,514,634, and 6,136,745, the content of which is hereby incorporated by reference.

The polymerisation reaction may also be carried out using a metallocene type catalyst such as those described in U.S. Pat. Nos. 5,580,939, 4,808,561, 5,055,438, and 5,703,187, the subject matter of which is incorporated herein by reference.

It is also possible to use late transition metal e.g. platinum or palladium, catalyst complexes such as those described in U.S. Pat. No. 5,866,663, the subject matter of which is incorporated herein by reference.

The process can also be applied with the iron and/or cobalt complexes catalysts, e.g. such as those disclosed U.S. Pat. No. 5,955,555.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

For details on prepolymerisation see U.S. Pat. Nos. 4,923,833, 5,283,278 and 4,921,825 and 5,654,248 all of which are herein fully incorporated by reference.

In another embodiment of the invention, the catalyst system of the invention includes an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention.

In another embodiment of the invention, the catalyst system of the invention includes a polyolefin wax or tackifier or the like.

The polymerisation reaction is generally carried out under a pressure of 0.5 to 5 MPa and at a temperature of 0 to 135° C. The process is suitable for the polymerisation of one or more alpha-olefins containing 2 to 8 carbon atoms, in particular for the polymerisation of ethylene or propylene. It is especially suitable for the copolymerisation of ethylene with at least one alpha-olefin containing from 3 to 8 carbon atoms, or for the copolymerisation of propylene with at least one alpha-olefin containing from 4 to 8 carbon atoms.

The following Examples will illustrate the present invention.

EXAMPLE 1

The process is carried out in a fluidised bed gas phase polymerisation reactor consisting of a vertical cylinder of diameter 0.75 m and height 5 m and surmounted by a velocity reduction chamber. In its lower part, the reactor is equipped with a fluidisation grid and an external line for recycling gas, connecting the top of the velocity reduction chamber to the lower part of the reactor, situated under the fluidisation grid. The gas recycling line is equipped with a compressor and with a heat transfer means. Opening into the gas recycling line there are, in particular, the feed lines for ethylene, 1-butene, hydrogen and nitrogen, which represent the main constituents of the gas reaction mixture passing through the fluidised bed.

Above the fluidisation grid the reactor contains a fluidised bed consisting of a linear low density polyethylene powder. The gas reaction mixture, which contains ethylene, 1-butene, hydrogen and nitrogen passes through the fluidised bed at a pressure of 2 MPa, at 80° C. and with an upward fluidisation velocity of 0.36 m/s.

The polymerisation reactor is fitted with three sets of wall temperature indicators at 0.5 m 1.0 m and 1.5 m above the fluidisation grid.

The catalyst used is a Ziegler-Natta catalyst prepared according to Example 1 of EP-A-0 529 977.

Under these conditions a linear low density polyethylene with a density of 0.918, a melt index of 0.9 g/10 minutes under a 2.16-kg load at 190° C. is manufactured at an output of 100 kg/h.

Following a period of stable operation, for unknown reasons the wall temperature indicator at the 0.5 m position reached 85° C.; in response, carbon monoxide gas diluted to a level of 10000 ppm in a nitrogen gas carrier was introduced into the reactor via the gas recycling line. The quantity of carbon monoxide injected was 0.00055 g of CO per g of catalyst present in the bed. Within a period of approximately 12 minutes the wall temperature indicators had returned to their nominal values of 80° C. During this period the feeding of catalyst into the reactor was not discontinued and the production rate was slightly decreased by 5% and then went back to its normal value within 18 minutes.

Comparative Example

A gas phase fluidised bed reaction system identical to the one described in Example 1 is utilised in exactly the same conditions as in Example 1. When the wall temperature indicator at 0.5 m above the grid indicated a temperature of 85° C. carbon monoxide gas diluted to a level of 10000 ppm in a nitrogen gas carrier was introduced into the reactor via the gas recycling line. The quantity of carbon monoxide injected was 0.0025 g of CO per g of catalyst present in the bed. A huge drop in the production rate (greater than 40% in less than 2 minutes) was consequently experienced; this led to the destabilisation of the reactor temperature and to large fluctuations of the reactor operating conditions. The catalyst injection was consequently halted and the reactor shut down.

What is claimed is:

1. A process for the gas phase polymerisation of one or more alpha-olefins conducted in the presence of a catalyst in a reactor having a fluidised bed, in which process, one or more zones having a temperature greater than an average bed temperature are formed at or in close proximity to a wall of the reactor, comprising the step of deactivating said zones by the introduction into the reactor of an effective quantity of carbon monoxide.

2. A process according to claim 1 wherein the weight ratio of carbon monoxide to catalyst is 0.0002–0.0011:1.

3. A process according to claim 2 wherein the weight ratio of carbon monoxide to catalyst is 0.0007–0.0009:1.

4. A process according to claim 1 wherein the rate of polymerisation is maintained substantially constant.

5. A process according to claim 2 wherein the weight ratio of carbon monoxide to catalyst is 0.0004–0.0011:1.

6. A process according to claim 1 wherein the carbon monoxide is introduced into the reactor at one or more points underneath a fluidisation grid.

7. A process according to claim 1 wherein feeding of catalyst into the reactor is not discontinued.

8. A process according to claim 1 wherein the catalyst is a Ziegler-Natta catalyst based on magnesium, halogen, titanium and/or vanadium and/or zirconium.

9. A process according to claim 1 wherein the catalyst is a metallocene catalyst.

10. A process according to claim 1 wherein the alpha-olefin(s) contain from 2 to 8 carbon atoms.

* * * * *